United States Patent [19]
Koenig et al.

[11] Patent Number: 4,767,083
[45] Date of Patent: Aug. 30, 1988

[54] HIGH PERFORMANCE FORWARD SWEPT WING AIRCRAFT

[75] Inventors: David G. Koenig, Sunnyvale; Kiyoshi Aoyagi, Mountain View; Michael R. Dudley, Los Altos, all of Calif.; Susan B. Schmidt, Pensacola, Fla.

[73] Assignee: The United States of America as represented by the Administrator of the National Aeronautics and Space Administration, Washington, D.C.

[21] Appl. No.: 933,963

[22] Filed: Nov. 24, 1986

[51] Int. Cl.$^4$ .................. B64C 21/04; B64D 29/02
[52] U.S. Cl. ............................ 244/12.3; 244/12.4; 244/207; 244/45 A; 244/55
[58] Field of Search .............. 244/15, 12.1, 12.3, 244/12.4, 12.5, 207, 208, 45 R, 45 A, 53 B, 55, 73, 36

[56] References Cited

U.S. PATENT DOCUMENTS

| | | | |
|---|---|---|---|
| 3,017,140 | 1/1962 | Barnard | 244/15 |
| 3,397,854 | 8/1968 | Reyle | 244/55 |
| 3,576,300 | 4/1971 | Palfreyman | 244/36 |
| 3,677,501 | 7/1972 | Denning | 244/12.5 |
| 3,785,593 | 1/1974 | Von Ohain et al. | 244/208 |
| 4,326,686 | 4/1982 | Runge | 244/207 |
| 4,442,986 | 4/1984 | Rousseau | 244/12.1 |
| 4,478,378 | 10/1984 | Capuani | 244/12.5 |

FOREIGN PATENT DOCUMENTS

| | | | |
|---|---|---|---|
| 681193 | 1/1965 | Italy | 244/12.3 |
| 1328210 | 8/1973 | United Kingdom | 244/207 |

OTHER PUBLICATIONS

Moore et al, "X29 Forward Swept Wing Aerodynamic Overview", AIAA-83-1834, 7-1983.
Jane's, All the World Aircraft, 1982–1983, p. 808.

Primary Examiner—Galen Barefoot
Attorney, Agent, or Firm—Darrell G. Brekke; John R. Manning; Charles E. B. Glenn

[57] ABSTRACT

A high performance aircraft capable of subsonic, transonic and supersonic speeds employs a forward swept wing planform and at least one first-and-second-solution ejector located on the inboard section of the wing. A high degree of flow control on the inboard sections of the wing is achieved along with improved maneuverability and control of pitch, roll and yaw. Lift loss is delayed to higher angles of attack than in conventional aircraft. In one embodiment the ejectors may be advantageously positioned spanwise on the wing while the ductwork is kept to a minimum.

9 Claims, 6 Drawing Sheets

FIG_1

FIG_2

FIG_3

FIG_4

FIG_5

FIG_6

FIG_7

FIG_8

FIG_9

FIG_10

FIG_11

HIGH PERFORMANCE FORWARD SWEPT WING AIRCRAFT

ORIGIN OF THE INVENTION

The invention described herein was made by employees of the United States Government and may be manufactured and used by or for the Government for governmental purposes without the payment of any royalties thereon or therefor.

TECHNICAL FIELD

The invention relates to an improved high performance forward swept wing aircraft with an ejector for augmenting thrust and improving flow and stall control throughout the aircraft's speed regime.

BACKGROUND OF THE INVENTION

Present day efforts in the aircraft industry are directed to developing aircraft that can operate at very high or supersonic speeds. Such supersonic aircraft, particularly when used as combat fighter planes, should be highly maneuverable to allow rapid turns, rolls, dives and ascents without danger of stalling or loss of control. Some aircraft may need to cruise long distances at supersonic speeds requiring the most efficient integration of the engine-propulsion system and the external airframe aerodynamics. Also, it is desirable that the aircraft should be capable of performing landings and takeoffs at low subsonic speeds, using a minimum length runway or, for some missions, landing or taking off vertically. To realize these goals for high speed aircraft, it is necessary to have optimum control of powered lift and air flow.

Recent investigations of aircraft configurations indicates that a significant number of benefits may be achieved by utilizing a forward swept wing (FSW) planform. When an FSW is used in combination with a canard at transonic and low supersonic maneuvering flight, favorable interference is provided over the inboard portion of the wing where the shock is strongest. This leads to higher aerodynamic efficiency than with the use of aft swept wings. In an aft-swept wing configuration the spanwise flow normally thickens the boundary layer at the tips. The flow on an FSW tends to separate first at the inboard section while good flow conditions can be maintained at the tip because of low induced angles of attack of the outer wing sections and because the air tends to flow toward the root rather than to the tip as it does on a sweptback wing. These flow conditions result in stall characteristics which allow the ailerons to remain effective at high angles of attack, even after most of the wing has stalled. Thus the FSW aircraft is more controllable at higher lift coefficients. Another benefit is a geometric advantage when the FSW is utilized in an STOVL aircraft. A conflict in the positioning of wing box and the portion of the power system providing vertical thrust can produce problems with the fineness ratio, overall length, and area ruling. On a sweptback wing most of the root chord must be positioned at the center of gravity which conflicts with the positioning of the vertical thruster in any STOVL configuration. For the FSW, the root of the wing (containing the wing box) is located behind the center of gravity. FSW aircraft are described, for example, in DARPA Report 8709-80-TR-73, "Second Assessment of Forward Swept Wing Technology," March 1980.

Notwithstanding the above-mentioned attributes, because the FSW aircraft tends to stall first on the inboard wing sections rather than on the outboard sections, the inventors have found a need for additional flow or stall control in FSW aircraft when operating in low speed flight experienced during takeoff and landing as well as at high angles of attack. Further, there is a need for an improved FSW that can operate at high subsonic and moderate supersonic speeds (M, 1.5–3.0) and exhibit either or both good maneuverability and efficient sustained cruise flight characteristics.

SUMMARY OF THE INVENTION

Accordingly, it is an object of the invention to provide a forward swept wing aircraft with improved flight characteristics that may be economically constructed.

It is another object of the invention to provide an aircraft with an improved cruise flight efficiency (defined by the amount of fuel used to travel a given distance at specified airspeeds and altitudes).

It is still another objective of the invention to provide an aircraft with a higher degree of inflight maneuverability, measured by low and high speed vertical and lateral turn capability and fore/aft control of propulsive force.

It is still another object of the invention to provide an aircraft which may utilize reduced runway lengths for takeoff and landing.

It is still a further object of the invention to provide an aircraft wherein there is reduced structural plus propulsion weight for a given aerodynamic lift without penalizing cruise efficiency.

It is yet another object of the invention to provide an aircraft capable of delaying lift loss to higher angles of attack and controlling the aircraft when it starts to occur more than possible in conventional aircraft.

The attainment of the foregoing and related objects may be achieved through the use of an aircraft comprising a wing which is swept forward, a fuselage, a canard, a vertical tail, one or more ejectors which are designed to perform well throughout the full flight envelope of the aircraft, lifting jets, and at least one power plant for providing pressurized hot or cold gas to the ejectors as well as the propulsive jets.

In accordance with this invention, a high performance aircraft capable of subsonic, transonic and supersonic speeds employs a forward swept wing planform and at least one ejector located on the fuselage or inboard section of the forward swept wings. Each ejector device includes a variable-area inlet, primary nozzles for releasing engine gas and an aft-located variable-area exhaust. The inlet serves as a suction source and acts to control air flowing about the aircraft, particularly along the root or mid-section of the wings. The ejector is capable of operating in first (subsonic) or second solution (supersonic) modes. Each ejector inlet and exhaust includes actuated hinged walls or flaps for changing the flow area and modulating the pressure and velocity of air flow through the ejector. The controlled air flow may be advantageously used for stall prevention and to enhance circulating lift. The thrust of each ejector can be individually controlled to provide desired aircraft maneuvers. By virtue of the combination of the FSW configuration and the ejector apparatus, a high degree of flow control on the inboard sections of the wing, improved maneuverability and control of pitch, roll and yaw are made possible as well as efficient use of the available thrust.

This invention is directed to an aircraft which incorporates the FSW configuration and a thrust augmenting ejector, that is, an ejector that is designed for maximum thrust output as measured by the ratio of its momentum increment to that of its reference (primary) jet. The ejector is located in a general inboard location on the wing upper suface where stall control is most needed on the FSW due to its tendency to stall from inboard to outboard. The ejector is not as sensitive to inlet distortion as a gas turbine engine and therefore may ingest any nonuniform and turbulent flow which may develop on top of the wing. Thus, if any stall does start in the form of flow separation near the leading edge, the inlet of the ejector will ingest the resulting turbulent flow and help to prevent lift loss. In the embodiment of the invention for an aircraft capable of supersonic speed a single power plant is used with either one ejector or one main ejector and two supplemental ejectors all located on the upper, inboard section of the wing. In another aspect of the invention, a subsonic aircraft is provided with two power plants situated in nacelles located below the forward swept wings. A thrust augmenting ejector is positioned on top of the wing above each power plant. A valved crossover duct interconnects the port and starboard ejectors. Thus, if one engine fails, gas can still be routed to both ejectors. Other variations of all embodiments such as the addition of additional engines will not alter the function and advantages of the invention.

The attainment of the foregoing and related objects, advantages and features of the invention should be more readily apparent to those skilled in the art after review of the following more detailed description of the invention taken together with the drawings.

DETAILED DESCRIPTION OF THE INVENTION

Figure 1:
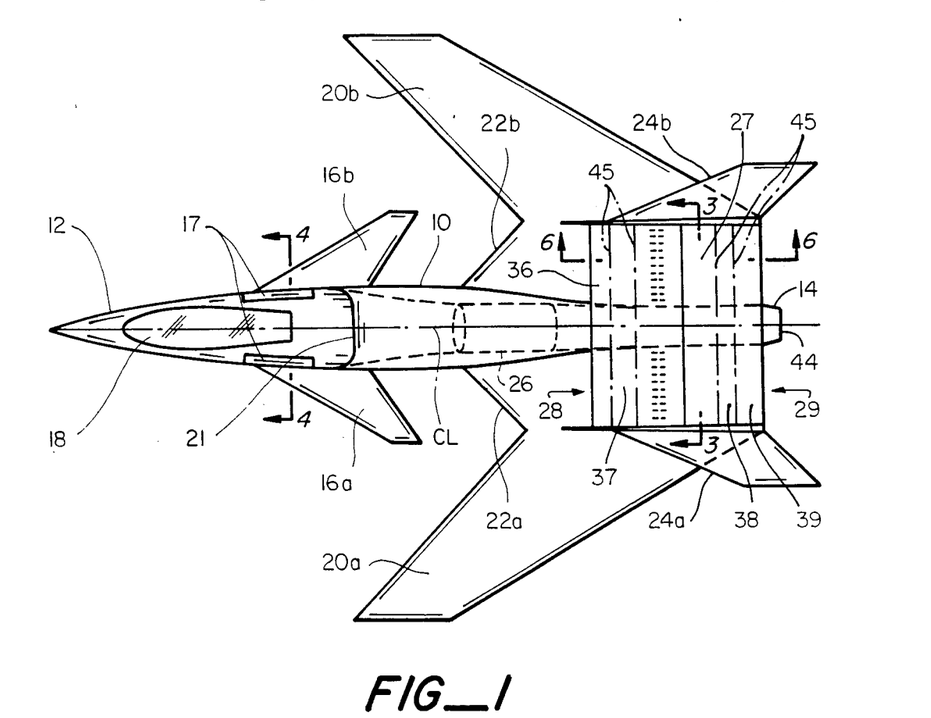
FIG. 1 is a top plan view of a supersonic forward swept wing aircraft made in accordance with this invention.
Figure 4:
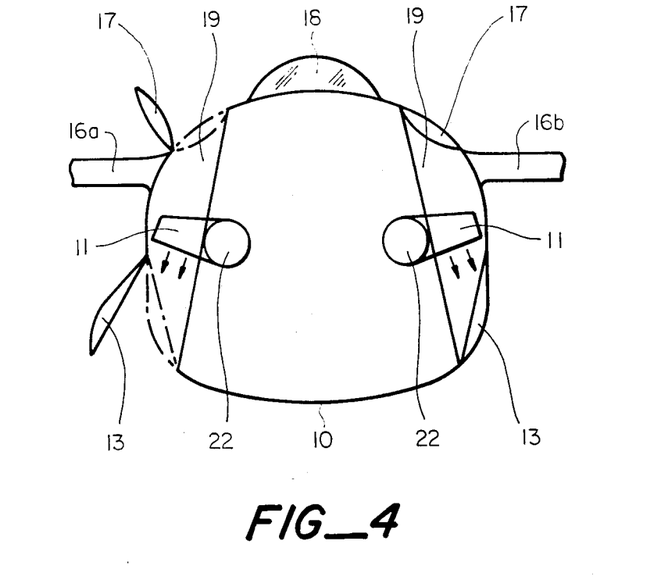
FIG. 4 is a forward-looking schematic cross sectional view taken through the fuselage (of the aircraft of FIG. 1) where the forward lifting jet doors are located.

Turning now to the drawings, and more particularly to FIG. 1, there is shown a supersonic aircraft, having a substantially symmetrical configuration about centerline CL, with a fuselage 10 which has a conical type nose section 12 and a tapered tail section 14. Sweptback canard horizontal trim and control surfaces 16a and 16b are located between cockpit 18 and forward swept wings 20a and 20b. The forward swept wings are located towards the rear of the aircraft mainly behind the aircraft center of gravity. Gloves or strakes 22a and 22b span between the fuselage and the wing leading edge and serve as fairings. The leading edge of each forward swept wing is preferably within the angle range of 20° to 50° (wing tip forward relative to perpendicular to the longitudinal centerline CL). The leading edge of each forward swept wing is preferably provided with leading edge flaps or slats (not shown) which may be dropped for stall control during high angle of attack and/or high lift condition modes. The trailing edges of the wings are provided with conventional flaps (not illustrated). The leading and trailing edge devices are well within the purview of the art, the details thereof form no part of the claimed invention, and the design thereof may vary as desired. The trailing edges of wings 20a and 20b have a greater angle relaive to the centerline than the leading edges so that the wings taper from a wide inboard area to a narrower area at their outboard ends. Typical wing thicknesses for high performance aircraft, particularly those flying at transonic and supersonic speeds, are well below 8% of the local chord measured in a cross section of wing which is parallel to the aircraft plane symmetry. For transonic and supersonic aircraft, this value is usually below 4% to minimize total wave drag of the aircraft. For single engine fighter aircraft such as the X-29 this means that the root chord thickness is less than seven inches. With a tip-to-root chord ratio of 0.3, the tip chord maximum thickness is about two inches. Because of the necessity of the thickness to be less at the leading and trailing edges, the total wing volume of a high performance aircraft is minimal and most of the volume is occupied by the main wing spar, skin and supporting structure as well as mission electronic gear and control system actuators. Vertical tail fins 24a and 24b are provided at the aircraft tail section to enable directional stability and steering control. Downward pointing lifting jets 11 in the area of door 13 (FIG. 4) are situated in the fuselage near the skin and beneath the aft end of the cockpit. One array of lifting jets 11 is positioned below the port canard and a second array is located below the starboard canard. A door 13, flush with the fuselage, is just below each array of lifting jets. See FIGS. 2, 4 and 5. A smaller door 17 is situated flush in the fuselage above each door 13. A vertical passageway 19 interconnects each door 17 with its respective door 13 (see FIG. 4) The doors 13 and 17 are closed when the lifting jets are not in use and the doors are opened when the jets are used so that air may flow through each passageway 19. A turbojet or turbofan engine 26 with an air inlet 21 provides the principal source of power for the aircraft. Gas flow from engine 26 is carried to the lifting jets by means of ducts 22 (FIGS. 2, 5) when diverter valves 23 are opened. The lifting jets are utilized during landing, takeoff and high speed maneuvering modes to provide a thrust to enhance control and to provide lift during vertical flight.

Figure 2:
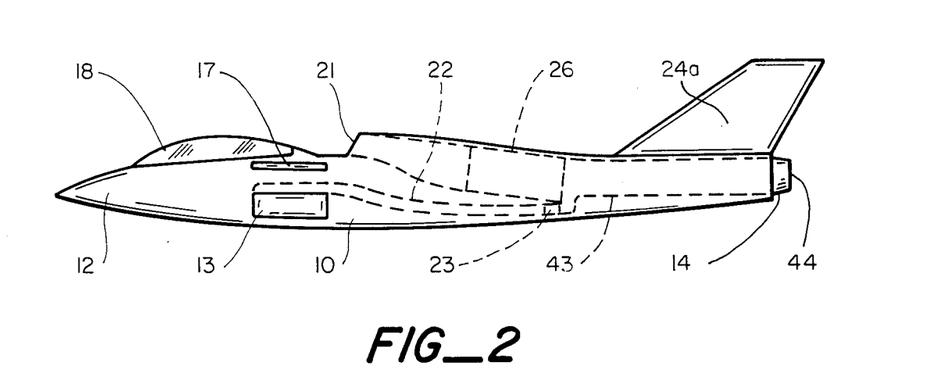
FIG. 2 is a side view of the FSW aircraft of FIG. 1. The wings, canards, and ejector are not illustrated to make it easier to see other features of the aircraft.
Figure 3:
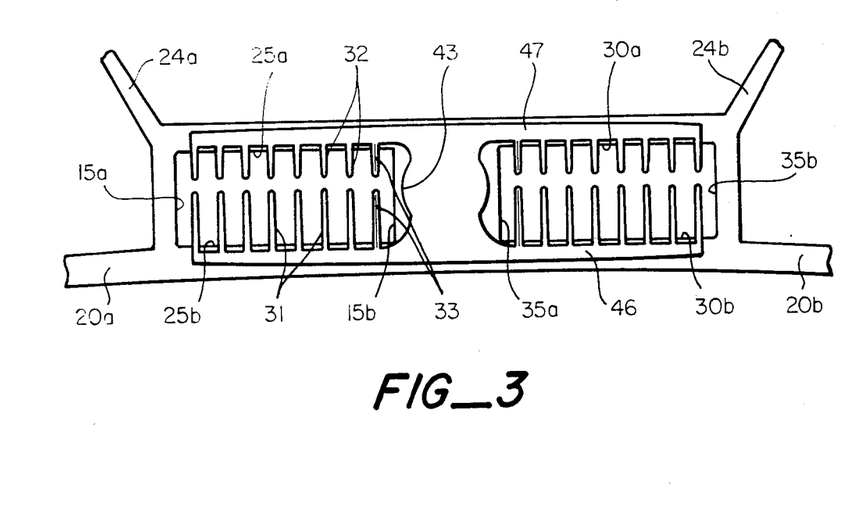
FIG. 3 is a forward-looking schematic cross sectional view of the ejector employed in the aircraft of FIG. 1.
Figure 5:
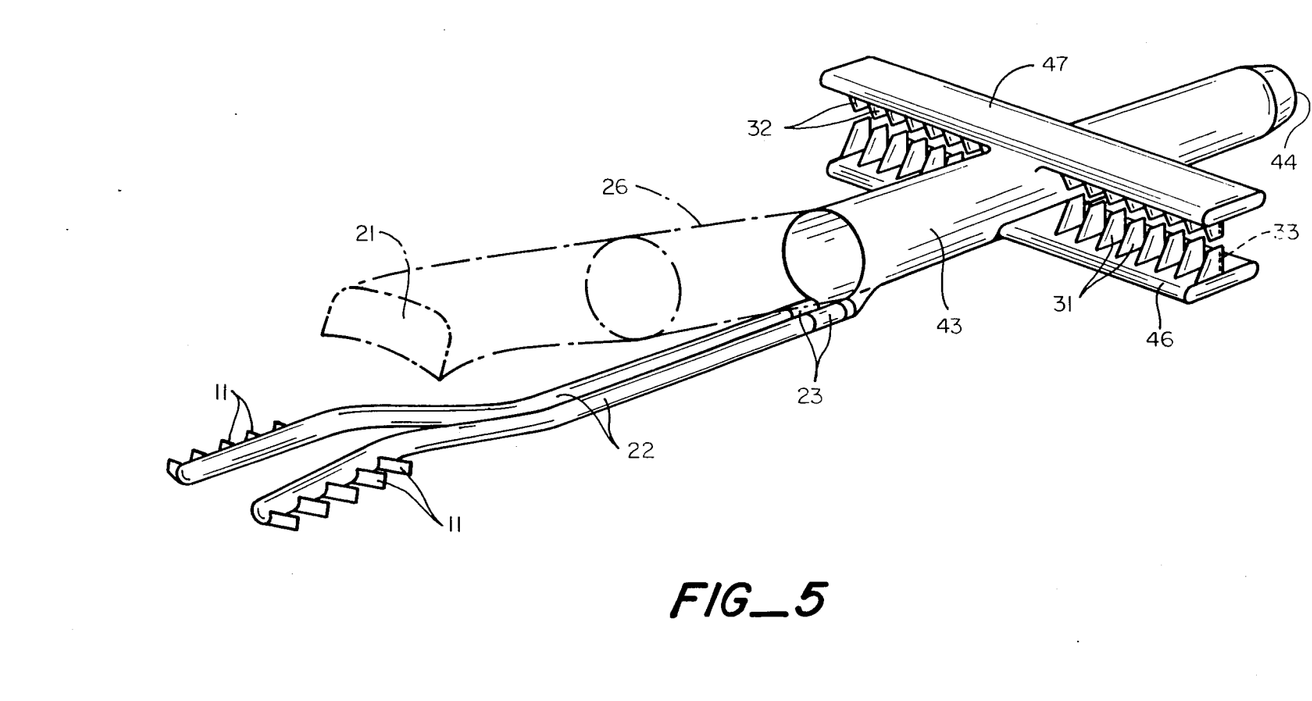
FIG. 5 is a perspective view of the ductwork coupled to the output of the engine for the aircraft of FIG. 1.
Figure 6:
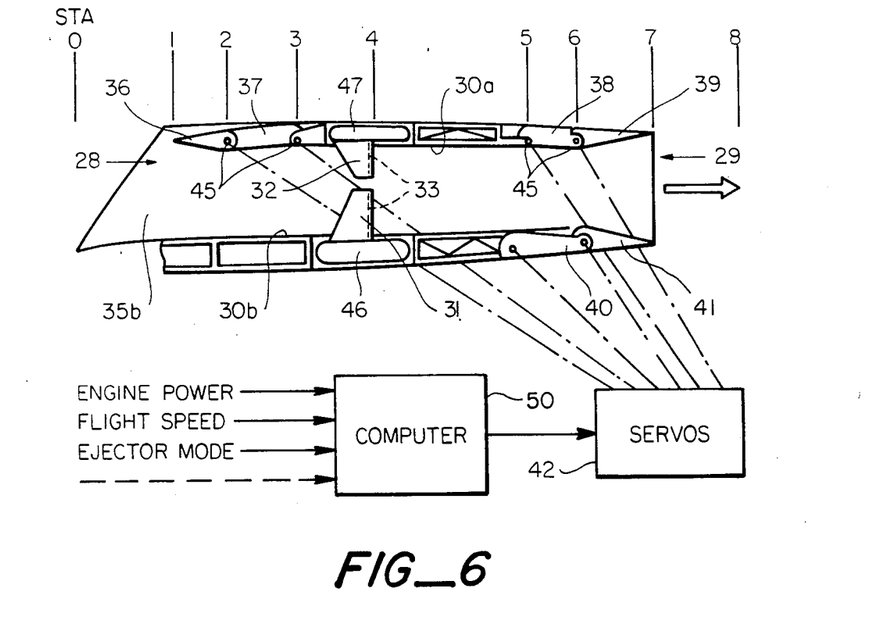
FIG. 6 is a left side schematic cross sectional view solely of the ejector plus a schematic of the circuit for actuating the pivotal inlet and exhaust flaps.

Turning now especially to FIGS. 1, 2 and 6, a thrust augmenting ejector 27 is positioned over the forward swept wing structure spanning the inboard portion of the wing between tail fins 24a, 24b. The ejector is a multi-wall structure that encircles a major gas duct and a plurality of gas-emitting nozzles 31, 32 and is capable of channeling ingested air from an inlet 28 past the nozzles and out an exhaust 29. A gas duct 43 divides the interior of the ejector into two passageways of equal streamwise cross sectional areas. The left passageway has opposed walls 15a, 15b and facing walls 25a, 25b whereas the right passageway has opposite walls 30a, 30b and facing walls 35a, 35b. Downstream from the inlet 28 are opposed linear arrays of nozzles. Nozzles 31 are in the first array and the bases of these nozzles are substantially level with the upper surface of the wing, and nozzles 32 are in the second array directly above. The nozzles 31, 32 are supported and fed gas by manifolds 46, 47 respectively (FIG. 5). Each nozzle 31, 32 has one or more downstream pointing orifice 33 for releasing gas derived from engine 26. The orifices can be circularly shaped, slot-shaped, etc. Each nozzle may have, for example, a single orifice 33 (FIGS. 3, 6) that occupies most of the downstream face. The ejector is of constant section spanwise and injects freestream air through the inlet where the air is mixed with engine gas expelled from nozzles 31, 32. The vertical dimension (the dimension or axis normal to the wing panel) of the inlet and exhaust areas are variable along the longitudinal axis. Both the inlet and exhaust of the ejector have pivotable interconnected hinged flaps or wall segments. The hinge or pivot axes 45 for the flaps extend along the span of the ejector. As the flaps are moved, different nozzle configurations (diverging/converging) are created at the inlet and exhaust, and the areas of the inlet and exhaust are varied. FIG. 6 includes a schematic cross sectional view of the augmentor depicting the pivotable flaps 36, 37 of the inlet 28 and pivotable flaps 38–41 of exhaust 29. The flaps 36–41 are actuated by servos 42 which are controlled by a computer 50 that responds to signals that are representative of ejector mode, engine power, flight speed, angle of attack and altitude. Additional signals representative of other real time aircraft conditions may be inputted to the computer for ejector control purposes. The computer controls the servos and pivots the inlet and exhaust flaps to insure that maximum ejector net thrust is obtained at all flight and engine conditions. The ingested air flow is considered the secondary flow in the ejector whereas the gas from the engine emitted from nozzle 31, 32 is considered the primary flow (or energizing gas flow). After the ingested air is mixed with the primary flow from nozzles 31,32 the mixed stream is released from the ejector via the exhaust. The purpose of the exhaust is to return the internal static pressure to that of ambient at or slightly downstream of the ejector and maximize the total net thrust for given combinations of aircraft flight condition and engine power setting.

FIG. 5 is a perspective view of the ductwork coupled to the exhaust of engine 26. The gas ejected from engine 26 is directed into large cylindrical duct 43 with an exhaust orifice 44. Opposed manifolds 46, 47 support nozzles 31, 32 and supply them with gas derived from duct 43. Ducts 22 also derive gas from duct 43. When diverter valves 23 are opened, gas flows from duct 43 to lifting jets 11 via ducts 22. A restrictor (not shown) in the aft end of duct 43 permits the gas flow from orifice 44 to be varied. At takeoff and other times the pilot may choose to channel a large quantity or all of the engine gas into the ejector.

The ejector thrusting system functions in the following manner. When the primary energized fluid from engine 26 is mixed with the secondary freestream fluid ingested in the inlet the mixed fluids achieve a momentum which is larger than the momentum of the primary fluid alone when exhausted ambient pressure. The thrust augmenting ejector operates at an overall static pressure ratio which is slightly less than one, that is, the ratio of the pressure ambient air approaching the inlet at station 0 (FIG. 6) to the static pressure of the exhaust at station 8 is about one. For any flight condition, the ejector inlet entrains air coming over the wing and strakes and acts as a source of suction or a sink at the upper root of wings 20a and 20b. The ejector inlet accelerates or decelerates the ingested mass flow by amounts depending on flight conditions, engine power setting, and whether or not the ejector is set to operate in the first or second solution mode. When the mixed fluids reaching station 6 are subsonic the ejector is operating in the first solution. When the mixed flow at that station is sonic or supersonic, the ejector is operating in the second solution.

In operation, streamwise variations in total internal cross section area for the inlet and exhaust of the ejector are varied so as to produce maximum thrust augmentation for a desired aircraft flight mode. This augmentation, in either solution of operation, may exceed a ratio of two. More specifically, when the aircraft is hovering, taking off or landing, the inlet is normally converging (flaps 36, 37 slope downward from station 1–3) and the exhaust is diverging and acting as a diffuser. In this instance the mixed primary and secondary fluids are subsonic and the ejector operates in the first solution mode. If the first solution mode was maintained with increasing airspeed; however, the net thrust of the ejector would deteriorate.

As high subsonic flight speeds are attained and transonic flight is approached the inlet flaps are moved to provide a slightly diverging configuration (flaps 36, 37 slope upward from station 1–3). Then when sufficient stagnation pressures are developed, a converging-diverging configuration and second solution ejector flow is initiated to maintain desired net ejector thrust. When the second solution is introduced the exhaust nozzle configuration is converted from diverging to converging-diverging as needed to produce sonic flow therethrough. When the aircraft is desired to operate at supersonic speeds the ejector is still maintained in the second solution mode with the inlet and exhaust each having a converging-diverging configuration. (That is, the upstream end of flap 36 is pivoted above the downstream end so that the inlet air is first converged. The upstream end of flap 37 is pivoted downward with respect to the downstream end so that the air passing by is diverged. At the ejector exhaust, flaps 38, 40 are pivoted in a converging manner and opposed flaps 39, 41 are swung in a diverging configuration.) The second solution operation enables thrust augmentation and supersonic flow in the ejector at station 7 up to at least Mach number 2.

The theory of first and second solution ejector operation is elaborated on in the articles, "Thrust Augmenting Ejectors," Part I, *AIAA Journal*, Vol. 21, No. 2, October 1983, and "Thrust Augmenting Ejectors," Part II, *AIAA Journal*, Vol. 21, No. 12, December 1983, by Morton Alperin and Jiunn-Jeng Wu.

Figure 7:
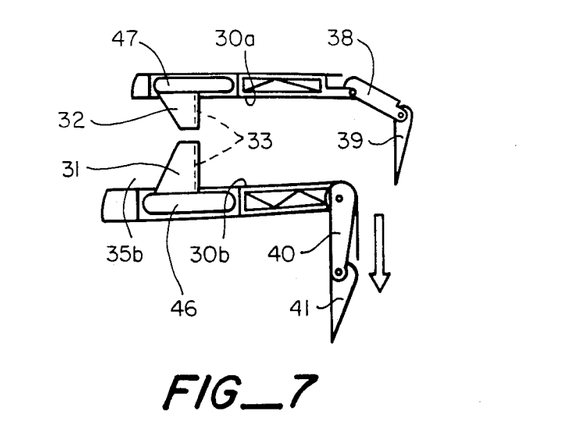
FIG. 7 is a left side schematic cross sectional view of the rear portion of the ejector when the flaps are in a hover-like configuration.

FIG. 7 is a schematic cross sectional view of the rear portion of the ejector and it depicts how the flaps of the ejector exhaust may be moved in a downward position so as to change the direction of thrust normal to the longitudinal axis of the aircraft. This configuration of the ejector exhaust is particularly useful for powered lift during takeoff and landing, hovering, and control during high speed flight to enhance turning during tactical maneuvering.

In whichever mode the subject ejector is operated (first or second solution) it can increase thrust at all flight speeds over that which could be produced by the engine alone. As a consequence, for a given total thrust needed to propel the aircraft the engine size can be reduced and a corresponding fuel economy can be realized. This is particularly true for high subsonic, transonic and supersonic flight speeds where second solution ejector operation brings higher overall propulsion efficiencies.

The hot engine gas is cooled considerably when it is mixed in the ejector with the ingested air. Thus, the fluids ejected from the ejector present a lesser infrared signature than the engine gas. The net result is that the subject aircraft is more difficult to detect with an IR detector than conventional aircraft.

The ejector is very useful as a flow control device to control stall on the wing surfaces. This feature is most helpful at high flight angles of attack where the strake and wing exhibit leading edge flow separation. If this flow separation were allowed to progress, the portion of the wing involved would lose lift. Placement of the injector inlet on the upper wing surface in the region extending from the leading edge back to midchord allows the inlet to ingest the turbulent flow of relatively low momentum (resulting from separation) and delay wing stall and its resulting lift loss. The flow on an FSW tends to separate first at the root. Thus, it is more efficient to locate the ejector at the wing root for flow control purposes as well as for structural and power transfer reasons.

In the past, ejectors operating only in the first solution were utilized on subsonic aircraft to enhance thrust at low airspeeds. These ejectors were retracted and stowed within the contours of the wings to avoid drag as the aircraft accelerated to high cruise flight. This approach is completely impractical for modern high performance aircraft, such as fighters, which are built with relatively small wing thicknesses and small overall aircraft cross-sections that are a necessity in order to limit transonic and supersonic drag. These ejectors, at best, only perform over the lower portion of the flight envelope.

Figure 8:
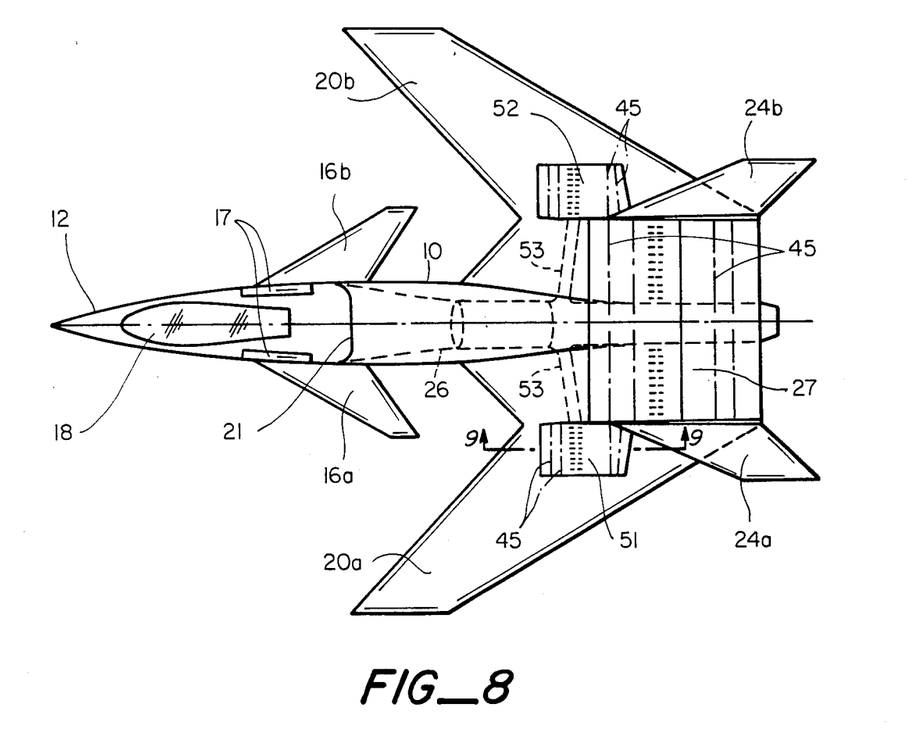
FIG. 8 is a top plan view of a second embodiment of the invention. It depicts an aircraft having two more ejectors than the aircraft in FIG. 1.
Figure 9:
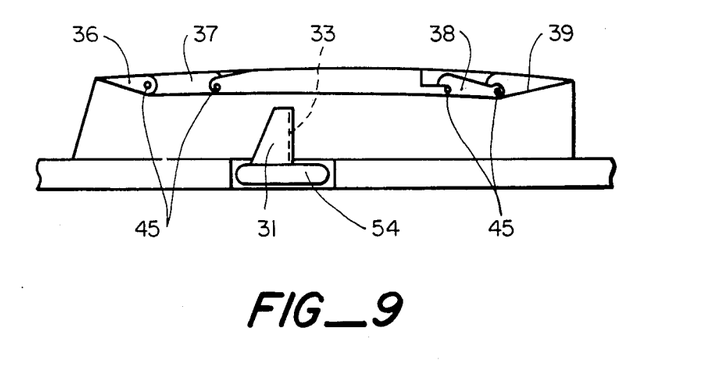
FIG. 9 is a left side schematic cross sectional view solely of the ejector for the aircraft of FIG. 8.

A second embodiment of the FSW aircraft incorporating the subject invention is depicted in FIG. 8. In this embodiment two additional secondary ejectors 51, 52 are located adjacent to the primary ejector 27 and symmetrical to the longitudinal axis of the aircraft. Otherwise the aircraft is identical to the one depicted in FIG. 1. These secondary ejectors are smaller than the primary ejector and are located at positions on the upper surface of the swept forward wings to allow the inlets to serve as additional flow control for the wing leading edges. These ejectors are also useful to provide auxiliary lateral and directional control. As the exhausts of ejectors 51, 52 eject gas over the trailing edge wing flaps they also augment flap lift during takeoff, landing, and high speed maneuvering. Ejectors 51, 52 are basically scaled down versions of principal ejector 27 except for a reduction in components. The geometry and mode of operation for the secondary ejectors is the same as for the principal ejector. The wing upper surface serves as the lower internal floor or wall of the ejector and thus changes in ejector internal cross section needed in the various flight operations must come from the upper wall structure of the ejector. Ejectors 51, 52 have pivotable flaps 36–39 as in ejector 27; however, they do not have any flaps 40, 41. See FIG. 9. The flaps are also actuated by computer-controlled servos. Further, the secondary ejectors only have one array of nozzles, a lower array of nozzles 31 that are supplied gas from the engine 26 by means of ducts 54 connected to manifold 46. Alternatively, the ducts 54, supporting and feeding nozzles 31, may be supplied by ducts 53 coupled to central duct 43. The maximum duct size is limited by available space in the wing and the minimum size is dictated by a need to keep gas flow Mach numbers in the duct below 0.25–0.4. Optionally, to simplify mechanical design of the secondary ejectors, the number of inlet and outlet pivotable flaps could be reduced from two to one. The single flap would be the same size as the replaced double flaps and the design of the single door would be optimized for the cruise flight conditions. Because of the secondary ejectors small size, the overall propulsion efficiency of the aircraft would not be penalized materially when the ejectors were operated "off design" at low flight speed.

Figure 10:
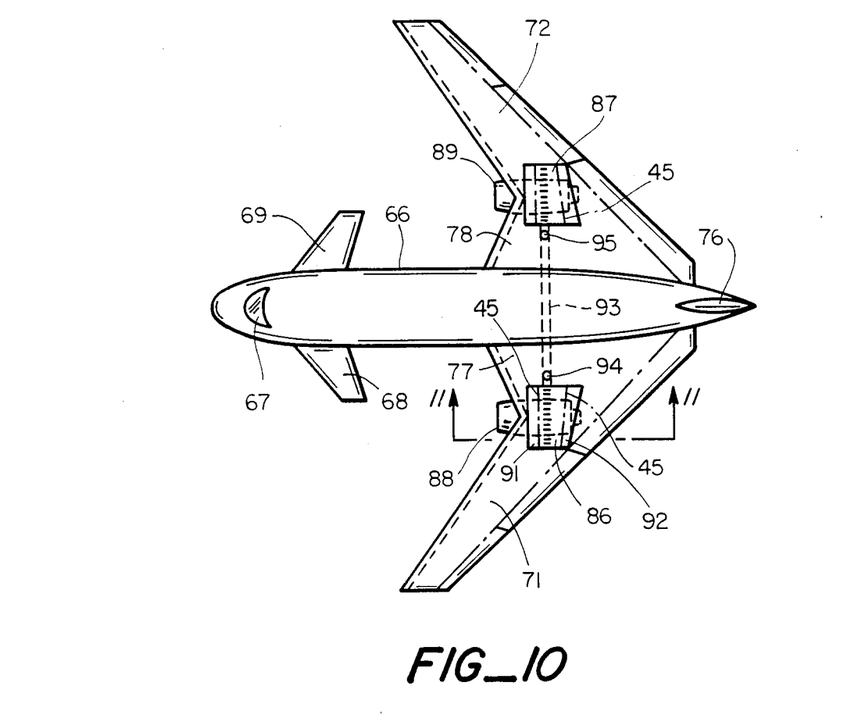
FIG. 10 is a top plan view of still another embodiment of the invention, a subsonic aircraft.
Figure 11:
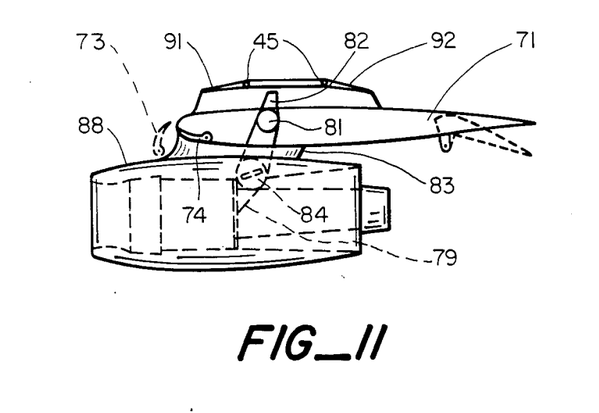
FIG. 11 is a left side view of an engine and a schematic cross sectional view of the wing and ejector above the engine for the aircraft of FIG. 10.

FIG. 10 depicts still another embodiment of the invention, a subsonic transport aircraft which is particularly suited for transport usage. Fuselage 66 houses a cockpit 67 and space for passengers and cargo. A vertical stabilizer and rudder 76 is located at the aft. Forward swept wings 71, 72 with strakes 77, 78 are attached to the rear of the fuselage mainly behind the aircraft center of gravity. The wings are tapered from inboard to outboard. The forward sweep of the wings is preferably in the range of 20° to 50° perpendicular to the longitudinal axis of the aircraft. Canards 68 and 69 are situated aft of the cockpit and forward of strakes 77, 78. The strakes and wings are provided with leading edge stall control devices such as leading edge slats. FIG. 11 shows the slats in their extended position 73 (providing maximum retardation of separation) and their retracted position 74 (position of non-use). Ejectors 86, 87 are positioned above the inboard portion of the forward swept wing panels. Nacelle-encased engines 88, 89, such as turbofan engines, are suspended below the FSW by pylons 83. Engines 88, 89 are positioned beneath ejectors 86, 87, respectively. A duct 79 channels gas from each engine up to a manifold 81 that supports and feeds gas to a linear array of ejector nozzles 82. The ducts 79 are routed through the pylons 83, respectively, and each duct 79 has a diverter valve 84 therein to control the amount of gas flow from the engine to the ejector. This arrangement of components, that is, the positioning of the engines beneath the ejectors, allows ducts 79 to be advantageously short. As with the secondary ejectors in the second embodiment, the upper wing surface is used as the lower wall of ejectors 86, 87. Ejectors 86, 87 are very similar to secondary ejectors 51, 52 except that they have a single pivotable inlet flap 91 and a single hinged exhaust flap 92. As in the previous embodiments the flaps are controlled by a computer 50 and servos 42. Although ejectors 86, 87 have no requirement to operate at supersonic speeds, the pivotable inlet/exhaust flaps 91, 92 still have to be programmed to provide maximum ejector thrust at low and high subsonic and transonic flight speeds employing either first or second solutions as appropriate. The ejectors are positioned mostly on the inboard portion of the FSW at a point where the wing tends to stall first with increasing angle of attack. As stated previously, this allows the inlet of each ejector to ingest the low momentum flow over the wing leading edge and delay spreading the stall to either the wing panels having sweptback leading edges (near the fuselage) or the inboard part of the swept forward panel.

For the sake of simplification of the power system of this embodiment only two engines have been disclosed in the drawings. It is to be understood that the subsonic aircraft may be powered by three or more engines (one engine in the center plus two wing-mounted engines) or two or more engines mounted on each side of the fuselage. When engines 88, 89 are both operating, gas is channeled to the ejector primary nozzles 82 via duct 79 and manifold 81. To help maintain equal amounts of thrust on each side of the aircraft when an engine fails or is shut down, a crossover duct 93 with valves 94, 95 therein interconnects the two manifolds 81. Valves 94, 95 are preferably valves that permit unidirectional flow such as globe valves. When both engines are running, the valves are closed to isolate the crossover duct 93 from the gas network. If an engine is shut down or becomes inoperative, the proper valves are activated in such a manner as to permit gas to flow to the ejector over the non-working engine. When an engine becomes inoperative the exhaust pressure/mass-flow schedule of the operating engine must be quickly trimmed (by the valving system and other controls) to produce thrust symmetry within the lateral and directional control power of the aircraft. It is essential that the valve control system be very responsive in order to maintain normal aircraft flight orientation during an engine failure.

The trailing edge flap system for all embodiments preferably minimally comprises an inboard flap set and an outboard flap set which is either blown (equipped with boundary layer control), plain or slotted. Gas for the blowing may be derived from the ejector nozzle manifolds. When these flaps are deflected the same on both sides the lift coefficient is increased to facilitate takeoff and landing. The flaps can also be used for pitch control by deflecting the inboard and outboard flaps by different amounts. Roll control is obtained by lateral differential deflection, particularly with the outer-most flaps serving as ailerons. The flaps behind the ejectors (second and third embodiments) work in conjunction with the pivotable flaps on the ejector exhausts to deflect the ejector flow downward or upward. This results in beneficial power-induced lift of varying amounts.

It will be noted in the plan views that the inlet and exhaust edges of ejectors 51, 52, 86 and 87 are truncated. The rear end angle (from plan view) of these ejectors has been slanted to increase the flap area covered by the flow ejected from the ejectors. Stated another way, the angling prevents the rear end of the ejector from overhanging the trailing edge flap.

Although the longitudinal axes of ejectors 86, 87 are shown to be substantially parallel to the fuselage longitudinal axis, it is to be understood that for optimum ejector performance the actual "yaw" angle of the ejectors should coincide with the flow angle on the upper surface of the wing under up and away flight conditions. The angle of the streamlines may be derived by computational methods or by wind tunnel tests.

In the third embodiment of the invention the ejector can stay on top of the wing but near the engine for maximum stall protection and minimal duct length while still allowing placement of the engine-ejector combination at the spanwise position where the best effective stall control can be accomplished. The placement does not interfere with the wing root structure near the fuselage (which takes fuselage and landing gear loads) or is it at a location which is too far out on the wing structure for adequate structural support (due to the thinness of the wing). The embodiment of FIG. 10 is particularly suited for larger and heavier aircraft than those depicted in FIGS. 1 and 8. In those situations where the larger aircraft do not require vertical takeoff and landing capability the ratio of total available propulsion thrust (direct engine thrust plus ejector thrust) to actual flying weight of the aircraft will be less than one. The ratio will preferably be larger for the aircraft of FIGS. 1 and 8. Therefore, the size of engine and ejector combination will be less in proportion to aircraft size for the subsonic aircraft of FIG. 10 than the supersonic aircraft of FIGS. 1 and 8. Also, in order to cruise efficiently at subsonic speeds, the aspect ratio (ratio of wingspan to chord) of the wing of the FIG. 10 aircraft will be higher than the ratio employed on the supersonic aircraft.

Several significant advantages are intrinsic in the third-embodiment aircraft. The ejectors delay the lift loss due to wind stall to higher angles of attack and, in some cases, increase the maximum lift that can be obtained by the aircraft. Very importantly, as the ejectors operate in the second solution for the higher flight speeds, the ejectors remain outside the aircraft contour without causing drag penalties. This permits the aircraft to have more storage volume for cargo, fuel, or avionics. The placement of the ejectors over the engines minimizes the amount of ductwork needed and significant hardware economies are realized. Still further, the ejectors enable lower safe landing and takeoff speeds by interacting with the trailing edge flap system to increase lift through both circulation lift induced by blowing over the top of the flap and by the vectoring of the direct thrust of the ejector.

It should be understood that the invention is not limited to the specific embodiments described above, and that other variations in configuration may be made within the scope of the invention. For example, directional control and stability of the aircraft may be achieved by the use of either one or two vertical stabilizers. In some instances the spanwise area of the injector may be varied for aerodynamic and/or installation considerations. Varying the number of engines will not alter the advantages of the invention. The need for the canard is dependent to a certain extent on the amount of forward sweep in the wings. In some situations pitch control could be derived by other means. For example, the canard could be eliminated where trim and control in pitch is provided by symmetrically adjusting the spanwise variation in wing lift by differentially controlling the front (outboard) and rear (inboard) wing flaps.

What is claimed is:
1. A high performance aircraft comprising:
a fuselage;
forward swept wings connected to said fuselage;
at least one engine having an inlet for generating a pressurized gas;

thrust augmenting ejector means having an inlet located apart from said at least one engine inlet and responsive to said pressurized gas, said ejector means inlet located above and on an inboard portion of said wings for augmenting thrust, enhancing circulating lift, and stall control, and said ejector means including a number of nozzles arranged along the span of the wings, a variable-area inlet and a variable-area outlet.

2. An aircraft as in claim 1 wherein said nozzles are arranged in first and second opposed linear arrays.

3. An aircraft as in claim 2 wherein said ejector means includes opposed first and second manifolds that supply gas to said first and second nozzle arrays, respectively.

4. A high performance aircraft comprising:
a fuselage;
forward swept wings connected to said fuselage;
at least one engine having an inlet for generating a pressurized gas; and
thrust augmenting ejector means having an inlet located apart from said at least one engine inlet and responsive to said pressurized gas, said ejector means inlet located above and on an inboard portion of said wings for augmenting thrust, enhancing circulating lift, and stall control, and vertical tail fins for providing directional stability and steering control, said vertical tail fins for providing directional stability and steering control, said vertical tail fins being mounted on said ejector means.

5. An aircraft as in claim 1 wherein said inlets and outlets of said ejector means include servo-actuated hinged flaps for changing the flow area and modulating flow pressure and velocity.

6. An aircraft as in claim 5 wherein said variable-area inlet and said variable-area outlet each at least have two serially connected hinged flaps.

7. An aircraft as in claim 6 wherein the flaps of said outlet are moved in a downward position so as to change the direction of ejector means thrust normal to the longitudinal axis of the aircraft.

8. A high performance aircraft comprising:
a fuselage;
forward swept wings connected to said fuselage;
at least one engine having an inlet for generating a pressurized gas; and
thrust augmenting ejector means having an inlet located apart from said at least one engine inlet and responsive to said pressurized gas, said ejector means inlet located above and on an inboard portion of said wings for augmenting thrust, enhancing circulating lift, and stall control; and
two ejectors operable in both first and second solution modes, said ejectors being located above said wings adjacent to said ejector means and forward of said ejector means, said ejectors being positioned symmetrical to the longitudinal axis of said aircraft, and said ejectors each having a single linear array of nozzles, a variable-area inlet, and a variable-area outlet.

9. An aircraft as in claim 8 wherein said ejector inlets and outlets include servo-actuated hinged flaps for changing flow area and modulating the flow pressure and velocity.

* * * * *